May 29, 1951      J. W. ALLEN      2,554,767
DRY SEAL PRESSURE TYPE GAS HOLDER
Filed June 4, 1947
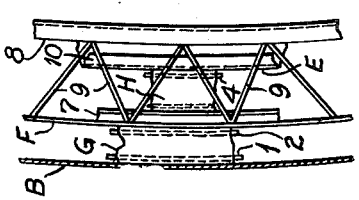
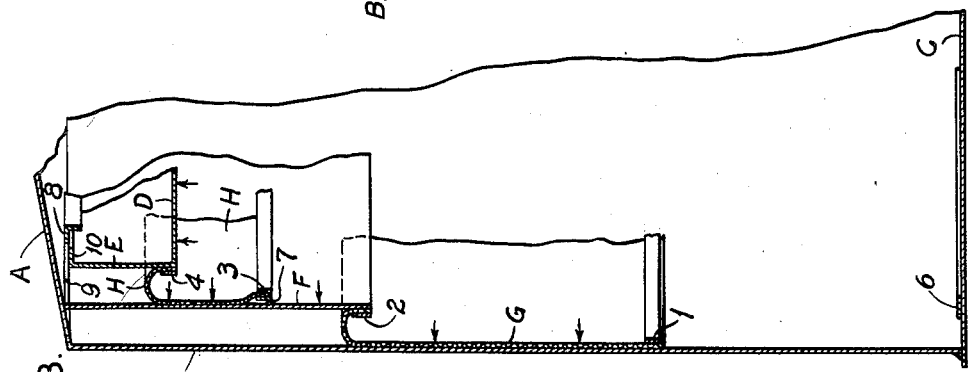
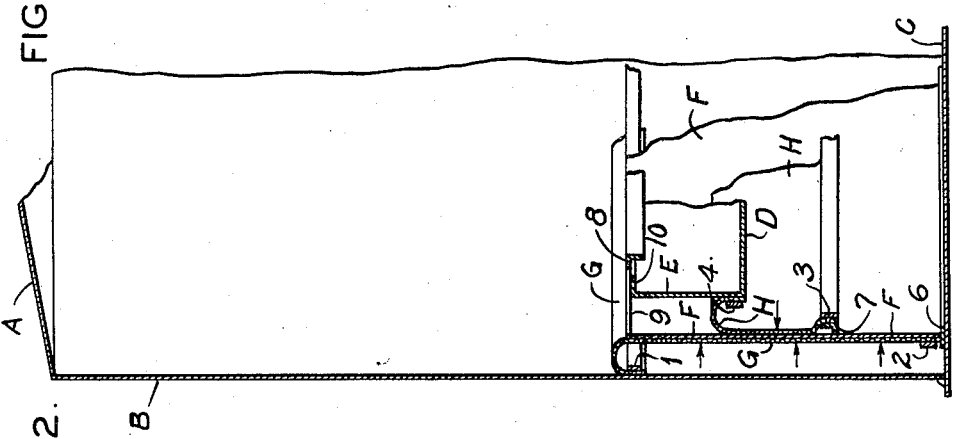
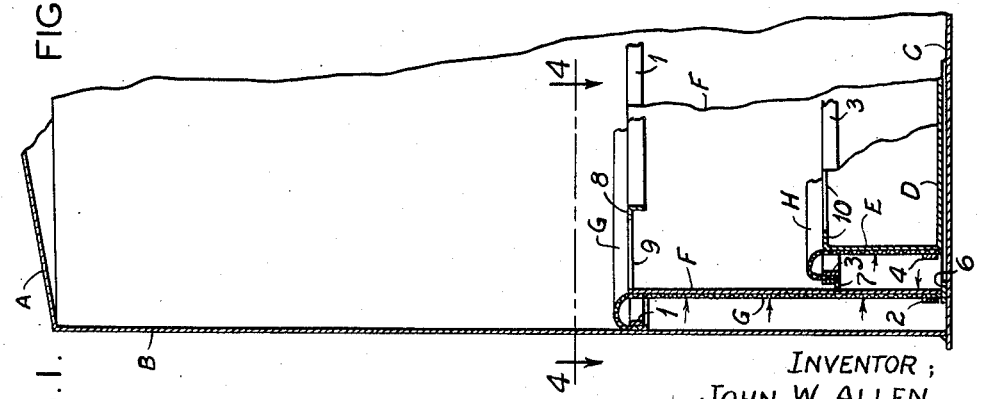
INVENTOR;
JOHN W. ALLEN
BY *Wells L. Church*
ATTORNEY Patented May 29, 1951

2,554,767

UNITED STATES PATENT OFFICE 2,554,767

DRY SEAL PRESSURE TYPE GAS HOLDER

John W. Allen, Chicago, Ill., assignor to John H. Wiggins, Chicago, Ill.

Application June 4, 1947, Serial No. 752,434

4 Claims. (Cl. 48—178)

This invention relates to dry seal piston type gas holders and other fluid storage apparatus of the particular type or kind in which the flexible curtain-like sealing means for the piston co-acts with a backing and reinforcing structure that comprises a plurality of concentrically-arranged annular members, at least one of which is capable of moving vertically relatively to a co-acting annular member during the cycle of operations of the piston, said backing and reinforcing structure being employed for the purpose of controlling the approximate shape or form of the piston sealing means, and preventing the same from being subjected to destructive strains resulting from pressure exerted on said piston sealing means by the gases or other medium confined in the apparatus.

One object of my invention is to provide an apparatus of the general type mentioned, in which the backing and reinforcing structure for the flexible piston sealing means comprises an annular member rigidly attached to the piston and a co-operating, vertically-movable annular member in the space between the container side wall and the fender on the piston, constructed and arranged in a novel manner that effectively prevents excessive wrinkling of the flexible piston sealing means, and also reduces the excess height of the container side wall required or made necessary by the use of a backing and reinforcing structure comprising telescoped or relatively-movable, annular members arranged in concentric relation.

Another object is to simplify the construction of the mechanism employed to actuate or operate the vertically-movable, annular member of a piston sealing means backing or reinforcing structure, equipped with two or more concentrically-arranged annular members that are adapted to be moved into different relationship with each other by the vertical movement of the piston.

Another object is to provide a piston sealing means backing and reinforcing structure of the general kind previously mentioned, in which a vertically-movable, annular member that is arranged between the piston and the side wall of the container, is of such design or construction, that it effectively resists pressure applied to its outer surface by compressive strains, and resists pressure applied to its inner surface by tensile strains.

And still another object of my invention is to provide a gas holder or the like, equipped with backing and reinforcing members for the piston sealing means, which are of such construction and arrangement that the combined required height of the backing member on the piston and the co-acting, vertically-movable backing member, does not exceed one-half the rise of the piston. Other objects and desirable features of my invention will be hereinafter pointed out.

Figure 1 of the drawings is a fragmentary vertical sectional view of a dry seal, pressure type gas holder constructed in accordance with my invention, showing the piston in its lowermost position or at the end of its downward stroke.

Figure 2 is a similar view, showing the piston after it has moved upwardly into approximately the position where the vertically-shiftable backing member starts to rise with the piston.

Figure 3 is a view similar to Figure 1, but showing the piston in its uppermost position, or in other words, at the end of its upward stroke; and Figure 4 is a fragmentary horizontally sectional view, taken on the line 4—4 of Figure 1.

In the accompanying drawings which illustrate the preferred form of my invention, A designates the roof of the container of the apparatus, and B and C, respectively, designate the side wall and the bottom of the container. The piston D, which reciprocates vertically in the container, constitutes the top wall of the gas storage space or chamber, and the annular space between the peripheral edge of the piston and the side wall of the container is sealed by a flexible curtain-like sealing means attached to the piston and to the container side wall, and preferably constructed of gas-tight fabric.

As previously stated, my invention consists of a novel backing and reinforcing structure for controlling the approximate shape or form of the above mentioned curtain-like piston sealing means, and for absorbing pressure exerted on said sealing means by the gases in the storage chamber of the apparatus. Preferably, said backing and reinforcing structure comprises an annular member E rigidly attached to the piston D and projecting upwardly from the peripheral edge of same, and a vertically movable, annular member F arranged in concentric relation with the piston member E and positioned between the same and the side wall B of the container. The previously mentioned piston sealing means with which said backing and reinforcing structure co-operates preferably comprises a flexible, curtain-like sealing element G attached to the container side wall and to the vertically-movable member F, and a separate and distinct flexible, curtain-like sealing element H attached to said member F and to the member E on the peripheral edge of the piston. For convenience, I have herein referred to the element G as the "outer" sealing element, because it is disposed on the side of the annular member F presented to the container side wall and have referred to the element H as the "inner" sealing element, because it is disposed on the side of the annular member F presented to the piston. As shown in the drawings, the vertically-movable member F is of considerably greater height or depth than the member E on the piston and the outer curtain-like element G that seals the space between the member F and the container side wall is of considerably greater depth than the inner curtain-like element H that seals the space between the member F and the peripheral edge of the piston. The relative heights or depths of the members E and F and of the piston sealing elements G and H may be varied without departing from the spirit of my invention, but I prefer to construct the apparatus so that when the piston D is in its lowermost position, as shown in Figure 1, the vertically-movable member F backs up and resists pressure exerted by the stored gases on all portions of the sealing element G, with the exception of a relatively small unsupported section at the upper end of said sealing element which assumes the form of an upwardly-disposed loop, and the member E on the piston backs up and resists pressure exerted on the gases on all portions of the sealing element H with the exception of a relatively small unsupported section at the upper end of said element which assumes the form of an upwardly-disposed loop. During the first portion of the upward stroke of the piston the gases confined in the apparatus cause the sealing element H to be progressively stripped off the member E on the piston and forced tightly against the inner side of the member F, which, at this time, is at rest. At a certain point in the upward travel of the piston, the member F starts to move with the piston, and thereafter during the remainder of the upward stroke of the piston into the position shown in Figure 3, the member F travels upwardly with the piston at the same speed as the piston, thereby causing the stored gases to strip the sealing element G off the member F and apply said sealing element to that portion of the side wall B of the container located above the point at which the outer edge of the sealing element G is attached to the container side wall.

In the drawings, the reference character 1 designates a seal bar or equivalent means that attaches one edge of the sealing element G to the container side wall, the reference character 2 designates a seal bar that attaches the opposite edge portion of said sealing element to the lower end of the member F, the reference character 3 designates a seal bar that attaches one edge portion of the sealing element H to the member F at a point substantially below the level of the seal bar 1, and the reference character 4 designates a seal bar that attaches the other edge portion of the sealing element H to the lower end or bottom edge portion of the member E on the piston.

One of the distinguishing characteristics of the novel gas holder herein described is that it comprises a telescoping or vertically-movable backing or reinforcing member between the container side wall and the rigid backing or reinforcing member on the piston, so constructed and arranged that it resists in compression any resultant pressure of one of the piston sealing elements caused by the internal pressure of the gas holder during a part of the vertical movement of the piston, and also resists in tension any resultant pressure of one of the piston sealing elements caused by the internal pressure of the gas holder during a part of the vertical travel of the piston. In other words, the vertically-movable backing member which is arranged in concentric relation or telescoped relation with the backing member on the piston, resists pressure applied to its outside surface by compressive strains, and resists pressure applied to its inside surface by tensil stresses. The above mentioned results are attained by providing the vertically-movable backing member F with upper and lower circular compression members attached to the inner side of said member adjacent the upper and lower ends of same. Preferably, the above mentioned lower circular compression member on the backing member F is formed by an angle bar 7 or other suitable kind of structure that is attached to the member F at such a point that when the piston is in its lowermost position, shown in Figure 1, the bottom edge of the member F will rest on the bottom C of the container or on blocks 6 positioned on the bottom of the container, and the compression member 7 on said backing member F will be located at about the same height or level as the upper end of the rigid backing member E on the piston. The upper circular compression member on the backing member F is herein illustrated as being formed by an annular member 8 set inwardly from the inner face or side of the member F, and a plurality of horizontally-disposed struts 9 attached to said annular member 8 and to the top edge of the member F in such a way as to produce a very stiff circular girder. In addition to imparting the required strength and stiffness to the upper end portion of the vertically-movable backing member F, the circular girder formed by the compression member 8 and struts 9 above described, constitutes an inwardly-projecting portion on the member F that overhangs the rigid backing member E on the piston, and thus causes said member F to be picked up and supported by the piston during part of the cycle of operations of the piston. Usually, the rigid backing member E on the piston will be made about one-third of the height or depth of the vertically-movable backing member F, and the relatively short piston sealing element or curtain H will be attached by the seal bar 3 to the circular compression member 7 on the member F. The backing member F has a height of approximately three-eighths of the rise of the piston, and the backing member E has a height of approximately one-eighth of the rise of the piston. Thus, the total is one-half the rise of the piston. In a gas holder of the construction above described it is necessary that the lower portion of the backing member F, located between its bottom edge and the compression member 7 be gas-tight, but the remainder of said member F located above the compression member 7 need not be gas-tight.

As previously stated, the piston D constitutes the top wall of the gas space or storage chamber, and in the drawings the arrows indicate the direction of the pressure of the gas inside of the apparatus. From Figure 1 it will be seen that when the piston is in its lowermost position the portion of the backing member F located below the circular compression member 7 is under neither compression nor tension, since the pressure of the gas balances on both sides of said member F. That portion of the member F between its top edge and the point of connection of the compression member 7 is under gas pressure applied to the outside of said member F. This would force the member F inwardly, but it is resisted by compression being set up in the members 7 and 8. After the piston has moved upwardly into the position shown in Figure 2, the major lower portion of the backing member F is under neither tension nor compression, because the gas pressure on both sides of said member F balances. The small upper portion of the member F is still under compression. In the uppermost position of the piston shown in Figure 3, it is seen that no portion of the member F is under compression. Under these conditions, the lower portion of the member F is under tension only, and the upper portion is under neither tension nor compression, because only atmospheric pressure applies to both sides of said upper portion.

By constructing the backing and reinforcing members E and F in the manner above described, it is possible to use two curtain-like flexible elements as the sealing means for the pistons, one of which curtains is attached to the side wall of the container at a certain proportion of the rise of the piston above the bottom of the container, and to the lower edge of the vertically-movable backing member F. The second curtain may be attached to the inner side of the vertically-movable backing member F, at a certain proportion of the rise of the piston above the bottom of the container and to the lower edge of the backing member E fixed to the piston. By properly proportioning these distances, it is shown that the excess height of the side wall of the container can be reduced to about one-eighth of the total rise of the piston.

It is assumed that the annular portion of the member F between the circular compression members 7 and 8 attached to same is stiff enough to resist any collapsing tendency of the gas pressure. In case it is necessary, vertical columns or equivalent means (not shown) may be attached to the member F in spaced relation around the circumference of same, so as to eliminate any possibility of the member F collapsing. Usually, the member E on the piston will be provided at or adjacent its top edge with a circular compression member 10 of stiff construction.

It should be noted that in my improved gas holder no auxiliary supports are required to sustain the vertically-movable backing member F when the piston is in its lowermost position. It should also be noted that the circular girder attached to the upper edge portion of the vertically-movable member F performs the dual function of a compression member for the member F, and a means that causes said member F to move upwardly with the piston and to be sustained by the piston at all times when the piston is in other than its lowermost position shown in Figure 1.

I have not herein illustrated any stabilizing mechanism for holding the piston level when it travels upwardly and downwardly, as any well known means may be used for this purpose.

Having thus described my invention, what I claim as new and desire to secure by Letters Patent is:

1. A fluid storage apparatus, comprising a container having a vertical side wall, a vertically-movable piston in said container that forms one horizontal wall of the gas storage space or chamber, a vertically-movable, annular backing member arranged in the space between the piston and the container side wall, a girder on said backing member, a flexible sealing element on the exterior of said backing member attached to the bottom edge portion of same and to the container side wall, and a second flexible sealing element on the interior of said backing member attached at one edge to the piston and attached at its other edge to said backing member at a point above the bottom edge of said backing member.

2. A gas holder of the kind described in claim 1, in which the piston is provided at its periphery with an upwardly-projecting backing member of less height or depth than the vertically-movable backing member first mentioned.

3. A fluid storage apparatus, comprising a container having a vertical side wall, a vertically-movable piston in said container that forms the upper horizontal wall of the gas storage space, an annular backing member projecting upwardly from the periphery of the piston, a concentric, vertically-movable, annular backing member arranged between the container side wall and the backing member on the piston, a sealing element arranged between the container side wall and the lower edge of said concentric backing member, a second sealing element attached at its inner edge to the lower end of the piston and having its outer edge attached to the concentric, vertically-movable backing member, and a stiff, annular girder projecting inwardly adjacent the upper edge of said concentric backing member.

4. A fluid storage apparatus, comprising a container having a vertical side wall, a vertically-movable piston in said container that forms the top horizontal wall of the gas storage space or chamber, an annular backing member projecting upwardly from the peripheral edge of the piston, a second vertically-movable, annular backing member arranged between the container side wall and the backing member on the piston, a relatively tall or deep, curtain-like sealing element attached at its outer edge to the container side wall and attached at its inner edge to the lower edge portion of said second vertically-movable backing member, a relatively short, curtain-like sealing element attached at one edge to the lower end of the piston backing member and having its opposite edge attached to the second vertically-movable backing member at a point above the bottom edge of same, and a stiff, annular girder projecting inwardly from the upper end portion of said second vertically-movable backing member and arranged in overhanging relationship with the annular backing member projecting upwardly from the peripheral edge of the piston.

JOHN W. ALLEN.

REFERENCES CITED

The following references are of record in the file of this patent:

FOREIGN PATENTS

| Number | Country | Date |
| --- | --- | --- |
| 4,790 | Great Britain | of 1823 |
| 573,423 | Germany | Mar. 31, 1933 |